(12) United States Patent  (10) Patent No.: US 8,717,746 B2
Kaufmann et al.  (45) Date of Patent: May 6, 2014

(54) COOLING APPARATUS FOR SWITCHGEAR WITH ENHANCED BUSBAR JOINT COOLING

(75) Inventors: Patrik Kaufmann, Baden (CH); Francoise Molitor, Zurich (CH)

(73) Assignee: ABB Technology AG, Zurich (CH)

( * ) Notice: Subject to any disclaimer, the term of this patent is extended or adjusted under 35 U.S.C. 154(b) by 170 days.

(21) Appl. No.: 13/426,651

(22) Filed: Mar. 22, 2012

(65) Prior Publication Data

US 2013/0250490 A1  Sep. 26, 2013

(51) Int. Cl.
*H05K 7/20* (2006.01)
(52) U.S. Cl.
USPC ........... 361/678; 361/624; 361/637; 361/650; 174/260; 174/548; 200/289
(58) Field of Classification Search
USPC ......... 361/601, 605, 611, 624, 632, 637, 647, 361/648, 650, 675–678
See application file for complete search history.

(56) References Cited

U.S. PATENT DOCUMENTS

| | | | |
|---|---|---|---|
| 3,728,585 A | 4/1973 | Olashaw | |
| 4,005,297 A * | 1/1977 | Cleaveland | 218/118 |
| 4,321,422 A | 3/1982 | Rogers | |
| 4,650,939 A * | 3/1987 | Milianowicz | 218/118 |
| 6,978,828 B1 | 12/2005 | Gunawardana | |
| 7,449,635 B2 * | 11/2008 | Wiant | 174/68.2 |
| 8,305,760 B2 * | 11/2012 | Howes et al. | 361/717 |
| 8,379,374 B2 * | 2/2013 | Keegan | 361/637 |
| 2008/0266803 A1 * | 10/2008 | Golhardt et al. | 361/700 |
| 2010/0301980 A1 * | 12/2010 | Bergamini et al. | 336/61 |
| 2010/0302715 A1 * | 12/2010 | Bortoli et al. | 361/676 |
| 2010/0304590 A1 * | 12/2010 | Frassineti et al. | 439/196 |

FOREIGN PATENT DOCUMENTS

| | | |
|---|---|---|
| DE | 3941388 A1 | 6/1991 |
| DE | 19715178 A1 | 10/1998 |
| EP | 1995840 A1 | 11/2008 |
| EP | 22800460 | 2/2011 |
| GB | 1390908 | 4/1975 |
| JP | 6162827 A | 6/1994 |
| JP | 52143488 A | 11/1997 |
| JP | 2004080972 A | 3/2004 |

OTHER PUBLICATIONS

PCT Search Report and Written Opinion in PCT/EP2013/055997 dated Jun. 13, 2013.

* cited by examiner

*Primary Examiner* — Courtney Smith
(74) *Attorney, Agent, or Firm* — Manelli Selter PLLC; Edward J. Stemberger

(57) ABSTRACT

A cooling apparatus is provided for a switchgear having at least one primary contact to connect to a terminal of a circuit breaker, with a busbar joint connected to the primary contact. The cooling apparatus includes an evaporator associated with the primary contact. A condenser is located at a higher elevation than the evaporator. Heat pipe structure fluidly connects the evaporator with the condenser. Heat transfer structure is coupled with the busbar joint for removing heat from the busbar joint. Working fluid is in the evaporator so as to be heated to a vapor state, with the heat pipe structure transferring the vapor to the condenser and passively returning condensed working fluid back to the evaporator for cooling the at least one primary contact.

17 Claims, 4 Drawing Sheets

COOLING APPARATUS FOR SWITCHGEAR WITH ENHANCED BUSBAR JOINT COOLING

FIELD

The invention relates to switchgear circuit breakers and, more particularly, to a cooling apparatus that enhances cooling of additional hotspot along the current path.

BACKGROUND

Switchgear configurations have current limits based on the heat rise over ambient room temperature. It is generally desired to limit the maximum temperature of the hottest spot on the switchgear main bus to 105° C. (a rise of 65° C. over an assumed ambient temperature of 40° C.), as directed by the standard IEEE 37.20.2. Typical medium and high-voltage metal-clad switchgear arrangements have maximum continuous current ratings of about 3000 A, due to heat generation. It is desirable to increase this current rating to about 4000 A.

Since these switchgears must be arcing fault resistant, it is exceedingly difficult to dissipate heat losses caused by the nominal currents inside the switchgear compartments. Currently heat losses are dissipated either by radiation and convection from the current path to the enclosure and then to the ambient environment. Such heat transfer processes are inefficient and, as a result, the switchgear product is usually thermally limited by its nominal current.

Thus, there is a need to provide a cooling apparatus for a switchgear that cools the primary contacts and also reduces the temperature increase along current paths including busbar joints.

SUMMARY

An objective of the invention is to fulfill the need referred to above. In accordance with the principles of the present invention, this objective is achieved by providing a cooling apparatus for a switchgear having at least one primary contact constructed and arranged to connect to a terminal of a circuit breaker, with a busbar joint being connected to the primary contact. The cooling apparatus includes an evaporator constructed and arranged to be associated with the primary contact. A condenser is located at a higher elevation than the evaporator. Heat pipe structure fluidly connects the evaporator with the condenser. Heat transfer structure is coupled with the busbar joint for removing heat from the busbar joint. Working fluid is in the evaporator so as to be heated to a vapor state, with the heat pipe structure being constructed and arranged to transfer the vapor to the condenser and to passively return condensed working fluid back to the evaporator for cooling the at least one primary contact.

In accordance with another aspect of an embodiment, heat transfer structure is provided for a switchgear having one or more primary contacts constructed and arranged to connect to a terminal of a circuit breaker, and busbar joints connected to the primary contacts. Each busbar joint includes at least a pair of first busbars in a parallel arrangement defining a space there-between. The heat transfer structure includes a plurality of fins and a plurality of heat spreaders that pass through the fins to join the fins so that the fins are in spaced relation. The heat transfer structure is constructed and arranged to be received in the space between the pair of first busbars so that the heat spreaders distribute heat along the first busbars, with the fins transferring heat to surrounding air by natural convection.

In accordance with another aspect of an embodiment, a method of cooling a switchgear is provided. The switchgear has at least one primary contact constructed and arranged to connect to a terminal of a circuit breaker, and a busbar joint connected to the primary contact. The method associates an evaporator with the primary contact. A condenser is located at a higher elevation than the evaporator. A heat pipe structure fluidly connects the evaporator with the condenser, and a working fluid is provided in the evaporator. The method couples heat transfer structure to the busbar joint. Heat is transferred from the primary contact to the working fluid to cause the working fluid to evaporate in the evaporator with the evaporated vapor being delivered to the condenser via the fluid conduit structure. Heat is removed from the busbar joint via the heat transfer structure. The working fluid that condenses in the condenser is passively retuned to the evaporator via the fluid conduit structure Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings wherein like numbers indicate like parts, in which.

DETAILED DESCRIPTION OF THE EXEMPLARY EMBODIMENTS

Figure 1:
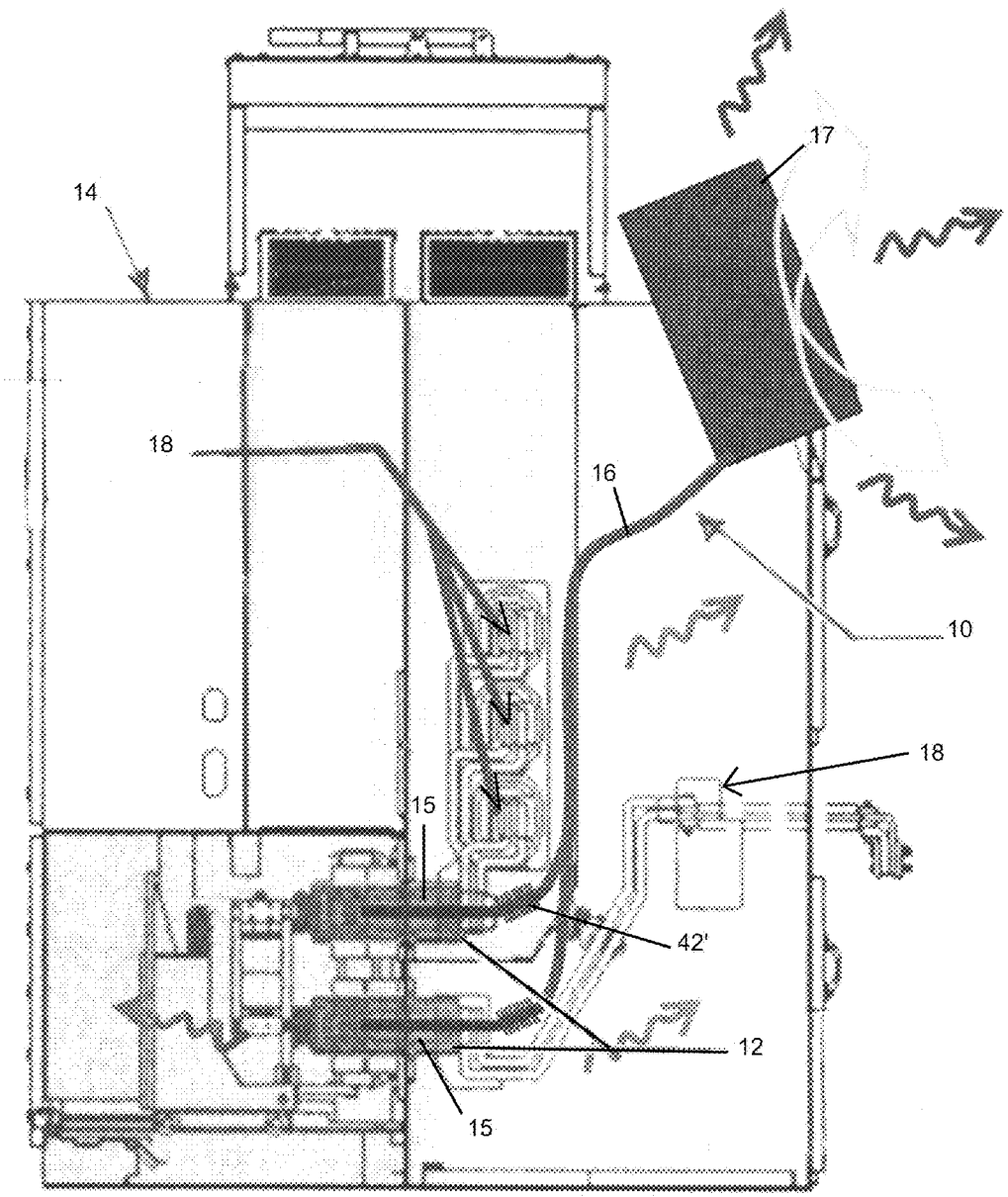
FIG. 1 is a view of an evaporative cooling apparatus in the form of a heat pipe structure, shown mounted in a switchgear.

With reference to FIG. 1, a cooling apparatus in the form of a heat pipe system, generally indicated at 10, is shown as disclosed in commonly owned, co-pending U.S. patent application entitled, "Switchgear Having Evaporative Cooling Apparatus", Ser. No. 13/444,888 the content of which is hereby incorporated by reference into this specification. The heat pipe system 10 is used to efficiently cool the primary contacts 12 without breaching the safety requirements for the self-contained compartments of the switchgear 14. The system 10 includes an evaporator 15 associated with each primary contact 12 and a heat pipe structure 16 coupled between the evaporators 15 and a condenser 17. The condenser 17 is located at a higher elevation than the evaporator 15. Heat of the primary contacts 12 causes working fluid in the evaporator 15 to evaporate and the vapor is directed to the condenser 17. Due to heat exchange with ambient air, the condenser 17 condenses the vapor back to liquid and the liquid working fluid returns, via the heat pipe structure 16, to the evaporators 15 to complete the cooling cycle. Such evaporative cooling reduces heat of at the main heat sources and allows a higher nominal current. However, due to the increased current flow, the heat loss along the current path and other electrical components becomes thermally limited, in particular at the busbar joints or cable connectors, generally indicated at 18, connected to the primary contacts 12.

Figure 2:
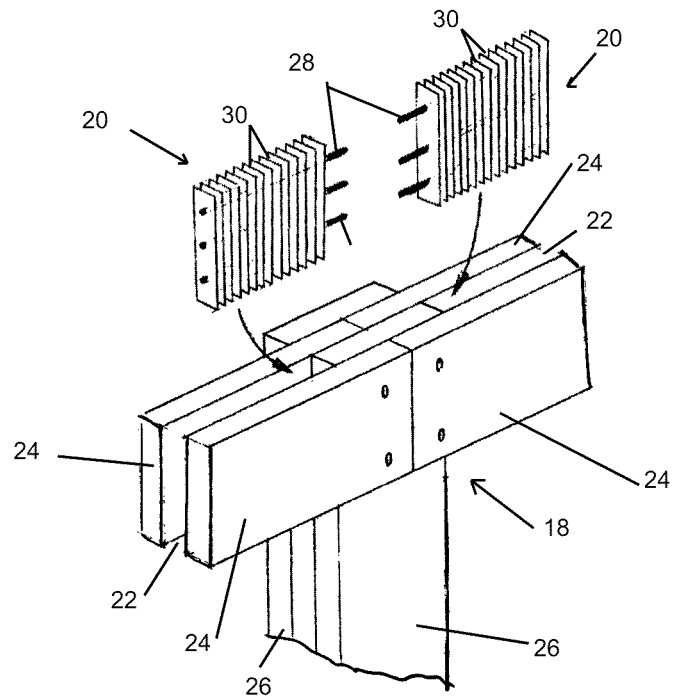
FIG. 2 is a view of vertical busbars coupled to horizontal busbars at a busbar joint, with heat transfer structure, in accordance with an embodiment, shown being inserted into spaces between the horizontal busbars.

With reference to FIG. 2, a first embodiment of a cooling apparatus for cooling the additional hotspots at the busbar joints 18 increases the heat transfer to the surrounding air. Thus the cooling apparatus is a heat transfer structure, generally indicated at 20, provided in a space 22 between a pair of first, horizontal busbars 24 arranged in parallel. The horizontal busbars 24 are coupled to second, vertical busbars 26 to define a busbar joint 18. The vertical busbars 26 are electrically connected with the primary contacts 12 in the conventional manner. Thus, the heat transfer structure 20 is used in combination with the heat pipe system of FIG. 1 to reduce the heat at the busbar joints 18.

Figure 3:
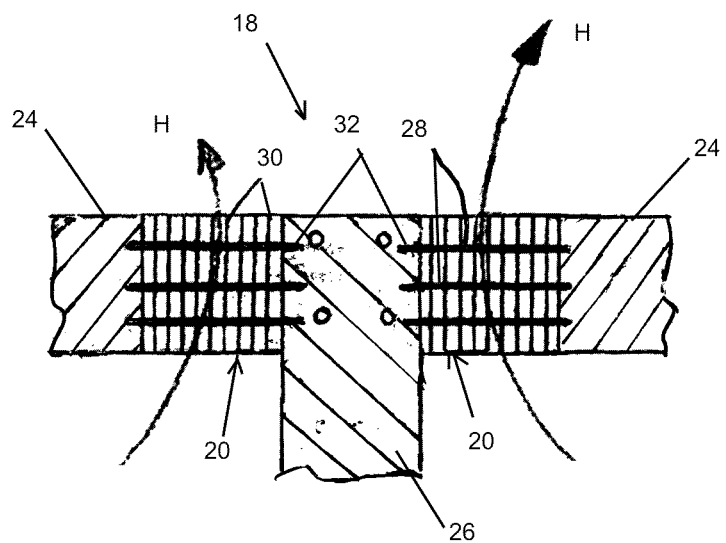
FIG. 3 is a sectional view showing the heat transfer structure of FIG. 2 coupled to the busbar joint.

With reference to FIGS. 2 and 3, the heat transfer structure 20 includes a plurality of heat spreaders 28 that pass through and join a plurality of fins 30 together. The fins 30 are metal and are in spaced relation. The fins 30 are disposed substantially transversely with respect to the heat spreaders 28. As shown in FIG. 3, each heat spreader 28 is a metal wire, heat pipe, or other heat transferring member with an end 32 engaged with a vertical busbar 26. The heat spreaders 28 reduce the temperature peak at the busbar joint 18, and distribute the heat along the busbars 24, 26. The fins 30 increase the heat transfer (arrows H) to the surrounding air by natural convection. Thus, passive cooling of the busbar joints 18 is accomplished. However, if the air circulation is forced, by, for example, fans, the heat removal could become active.

Since the heat spreaders 28 and fins 30 are metallic and in contact with the busbars 24, 26, they are at the same voltage potential as the busbars 24, 26. If the heat transfer structure 20 was not substantially surrounded by the busbars 24, 26, high electric fields would form at the tips of the fins 30. With the geometry of the heat transfer structure 20, the surrounding busbars 24, 26 provide a shielding effect to reduce the electric fields.

Figure 4:
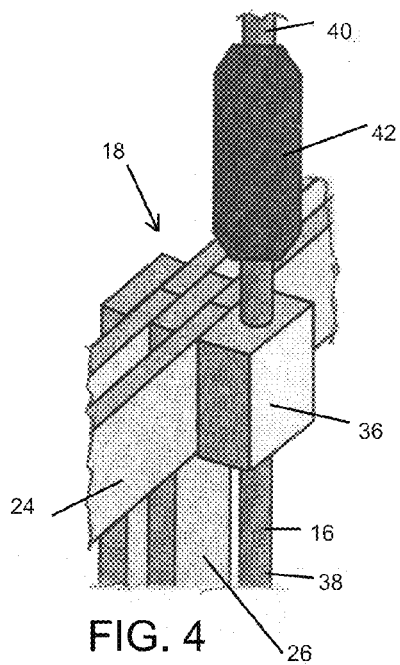
FIG. 4 is a view of a heat transfer structure as a connection between a busbar joint and a heat pipe structure.
Figure 5:
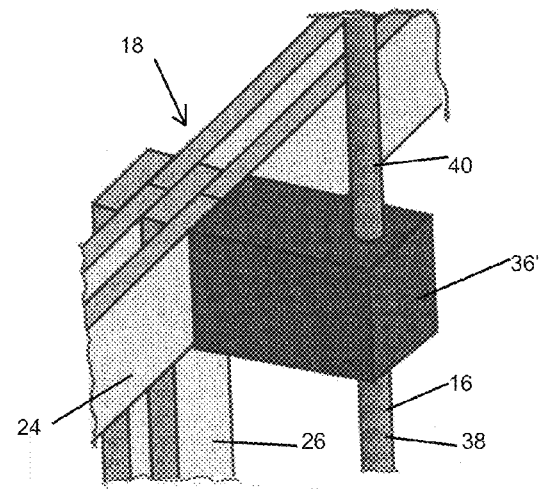
FIG. 5 is another embodiment of a heat transfer structure as a connection between a busbar joint and a heat pipe structure.
Figure 6:
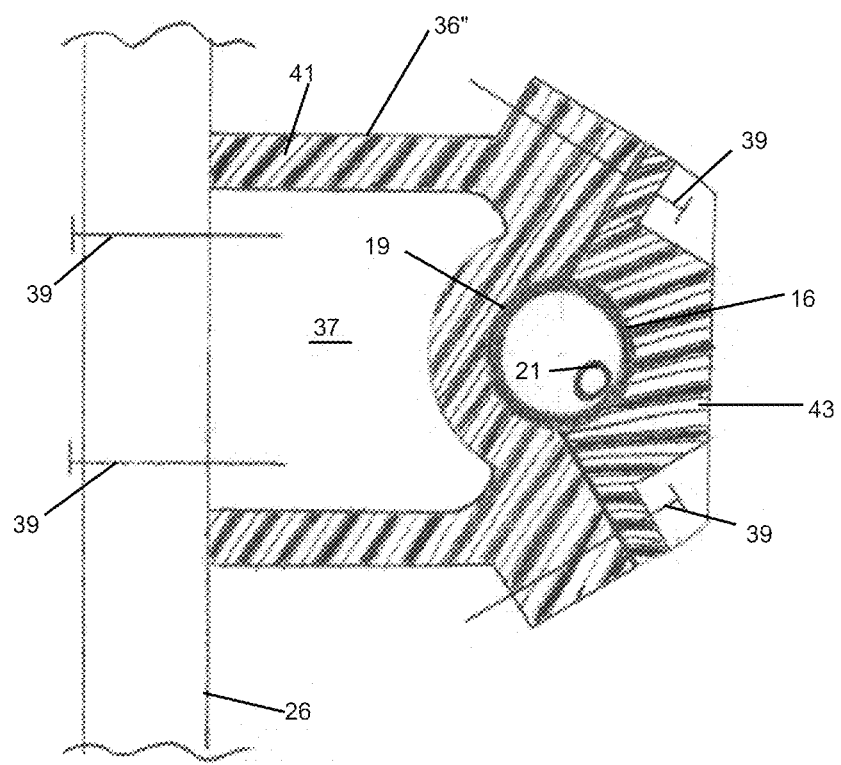
FIG. 6 is another embodiment of a heat transfer structure as a connection between a busbar joint and a heat pipe structure.

With reference to FIGS. 4-6, a second embodiment of heat transfer structure for cooling the busbar joints 18 is shown. The second embodiment includes directing the heat dissipated at the busbar joint 18 into the heat pipe system 10 (FIG. 1) used to cool the primary contacts 12. This second embodiment could be manufactured with rounded edges, or/and be covered by an insulating plastic layer (e.g. epoxy). Furthermore, its thermal conductivity could be improved by embedding short heat pipes inside of the structure.

With reference to FIG. 4, heat transfer structure, in the form of a metallic connection structure 36, is coupled between the busbar joint 18 (or a flat busbar 24, 26 thereof) and the round heat pipe structure 16. End 38 of the heat pipe structure 16 is in communication with the evaporator 15 associated with a primary contact 12. End 40 of the heat pipe structure 16 is in communication with the condenser 17 (FIG. 1). Thus, the hotspot at the busbar joint 18 serves as a secondary evaporator for the heat pipe structure 16. This method gives the lowest thermal resistance. However, there is no electrical insulation between the busbar joint 18 and the heat pipe structure 16. Thus, an electrically insulating section 42 of the heat pipe structure 16 is disposed between the connection structure 36 and the condenser 17. Up to the busbar joint 18, the heat pipe structure 16 can closely follow the busbar routing, and even be in direct contact as both have the same voltage potential. The system could even be further simplified by unifying the busbar and heat pipe tubing.

As used herein, "heat pipe structure" 16 generally connotes a single conduit component (e.g., hose, tubing, piping, and the like) or a network of vacuum-tight sealably connected conduit structures that carry the working fluid, either in a condensed state or an evaporated state, between an evaporator 15 and the condenser 17. For example, and as shown in FIG. 6, the heat pipe structure 16 can include a main tube 19 with a separated liquid return tube 21 therein such that vapor can pass to the condenser via a passage of the man tube and liquid can return to the evaporator 15 via the liquid return tube.

With reference to FIG. 5, another embodiment of the heat transfer structure in the form of connection structure 36' is shown. The connection structure 36' between the busbar joint 18 (or busbar 24, or 26 thereof) and the heat pipe structure 16 is made out of an electrically insulating material with good thermal conductivity. In this case, the insulating section 42' of the heat pipe structure 16 can be located right behind the primary contact (FIG. 1), and the heat pipe structure 16 can be at ground potential above this point. The thermal conductivity of the electrically insulating connection structure 36' could be improved by providing a metallic core 37 as shown in the electrically insulating connection structure 36" of FIG. 6. The metallic core 37, of material such as, aluminum or copper, can be coupled to the busbar 24 or 26 by screws 39. An epoxy layer 41 substantially surrounds the metallic core 37 to ensure the dielectric safety of surrounding components. An epoxy clamp 43 can clamp the heat pipe structure 16 to the epoxy layer 41 by the use of screws 39. The metal core 37 can be a single, solid member or can comprise a plurality of small heat pipes or spreaders. Again, in the embodiments of FIGS. 5 and 6, the busbar joint heat acts as a secondary evaporator.

Figure 7:
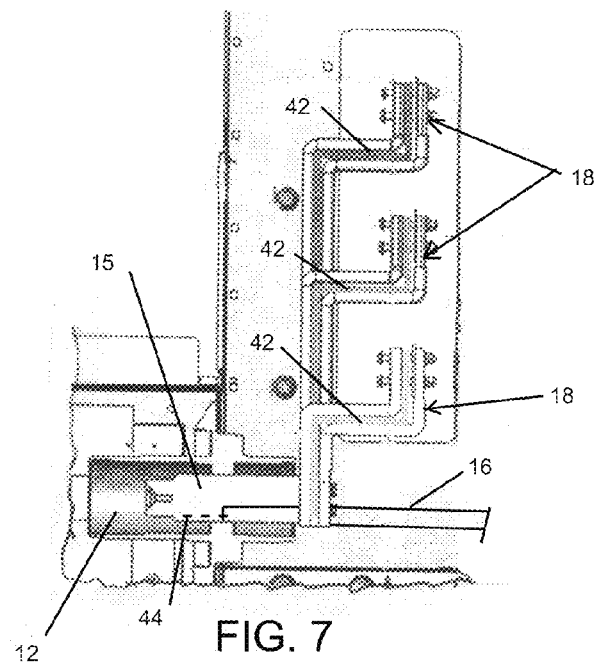
FIG. 7 is a view of another embodiment of heat transfer structure as heat spreaders transferring heat from a busbar joint to evaporators at primary contacts.

With reference to FIG. 7, yet another embodiment of heat transfer structure for cooling the busbar joints 18 is shown. Heat load from the busbar joints 18 is guided by heat transfer structure in the form of heat spreaders 42 (e.g., one or several heat pipes in parallel), disposed between pairs of parallel vertical busbars 26 and pairs of parallel horizontal busbars 24, down to the primary contact 12, to the evaporator 15 and to the working fluid 44. The heat from the primary contacts 12 and busbar joints 18 is then transferred via the working fluid in the heat pipe structure 16 to the condenser 17 in a passive manner. The heat spreaders are preferably metallic or other thermally conducive members that draw heat from the busbars 24, 26.

In the embodiment of FIG. 1, only the hotspots at the primary contacts 26 are cooled by the heat pipe 16. The heat dissipated at other points along the current path, as for example the busbar joints 18, can only be led away by radiation, convection or conduction along the busbars 24, 26. As the cooling of the primary contacts allows for higher current ratings, this is no longer sufficient, and, as already mentioned, additional hotspots appear. The embodiments of FIGS. 4-7 remove the heat from the busbar joints 18 via the heat pipe structure 16 used to cool the primary contacts 26, while the embodiment of FIG. 2 provides cooling of the busbar joints 18 by convection, allowing an increased current rating of the switchgear 14.

The cooling systems of the embodiments can be incorporated with only minor changes to a switchgear 14. With the embodiment of FIG. 2, the plurality of heat transfer structures 20 are of the same configuration so as to be cost-effective. With the embodiments of FIGS. 4-7, a lower part of the busbars 24, 26 can be in contact with the heat pipe structure 16 and therefore be cooled efficiently. This allows reduction of the busbar dimensions and saves material costs. The cooling system could even be further simplified by unifying the busbar and heat pipe structure. This cooling method can also be applied to any other additional hotspots.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A cooling apparatus for a switchgear having at least one primary contact constructed and arranged to connect to a terminal of a circuit breaker, with a busbar joint being connected to the primary contact, the cooling apparatus comprising:
    an evaporator constructed and arranged to be associated with the primary contact,
    a condenser located at a higher elevation than the evaporator,
    heat pipe structure fluidly connecting the evaporator with the condenser,
    heat transfer structure coupled with the busbar joint for removing heat from the busbar joint, and
    working fluid in the evaporator so as to be heated to a vapor state, with the heat pipe structure being constructed and arranged to transfer the vapor to the condenser and to passively return condensed working fluid back to the evaporator for cooling the at least one primary contact,
    wherein heat transfer structure comprises:
       a plurality of fins, and
       a plurality of heat spreaders that pass through the fins to join the fins so that the fins are in spaced relation,
    wherein the heat transfer structure is constructed and arranged to be received in a space between a pair of first busbars of the busbar joint so that the heat spreaders distribute heat along the first busbars, with the fins transferring heat to surrounding air by natural convection.

2. The cooling apparatus of claim 1, wherein the fins are metal and disposed substantially transversely with respect to the heat spreaders.

3. The cooling apparatus of claim 1, in combination with the busbar joint, with the pair of first busbars being coupled to second busbars, the second busbars being constructed and arranged to connect with a primary contact.

4. The combination of claim 3, wherein an end of each heat spreader is coupled with at least one of the second busbar.

5. The combination of claim 4, wherein each heat spreader is a metal wire or a heat pipe.

6. A cooling apparatus for a switchgear having at least one primary contact constructed and arranged to connect to a terminal of a circuit breaker, with a busbar joint being connected to the primary contact, the cooling apparatus comprising:
    an evaporator constructed and arranged to be associated with the primary contact,
    a condenser located at a higher elevation than the evaporator,
    heat pipe structure fluidly connecting the evaporator with the condenser,
    heat transfer structure coupled with the busbar joint for removing heat from the busbar joint, and
    working fluid in the evaporator so as to be heated to a vapor state, with the heat pipe structure being constructed and arranged to transfer the vapor to the condenser and to passively return condensed working fluid back to the evaporator for cooling the at least one primary contact,
    wherein the heat transfer structure includes a metal connection structure coupling the busbar joint to a portion of the heat pipe structure so that heat from the primary contact and the busbar joint is transferred by the heat pipe structure to the condenser.

7. A cooling apparatus for a switchgear having at least one primary contact constructed and arranged to connect to a terminal of a circuit breaker, with a busbar joint being connected to the primary contact, the cooling apparatus comprising:
    an evaporator constructed and arranged to be associated with the primary contact,
    a condenser located at a higher elevation than the evaporator,
    heat pipe structure fluidly connecting the evaporator with the condenser,
    heat transfer structure coupled with the busbar joint for removing heat from the busbar joint, and
    working fluid in the evaporator so as to be heated to a vapor state, with the heat pipe structure being constructed and arranged to transfer the vapor to the condenser and to passively return condensed working fluid back to the evaporator for cooling the at least one primary contact,
    wherein the heat transfer structure includes an electrically insulating and thermally conductive connection structure coupling the busbar joint to a portion of the heat pipe structure so that heat from the primary contact and the busbar joint is transferred by the heat pipe structure to the condenser.

8. The cooling apparatus of claim 7, wherein a thermally conductive portion of the thermally conductive connection structure includes a metal core.

9. A cooling apparatus for a switchgear having at least one primary contact constructed and arranged to connect to a terminal of a circuit breaker, with a busbar joint being connected to the primary contact, the cooling apparatus comprising:
    an evaporator constructed and arranged to be associated with the primary contact,
    a condenser located at a higher elevation than the evaporator,
    heat pipe structure fluidly connecting the evaporator with the condenser,
    heat transfer structure coupled with the busbar joint for removing heat from the busbar joint, and
    working fluid in the evaporator so as to be heated to a vapor state, with the heat pipe structure being constructed and arranged to transfer the vapor to the condenser and to passively return condensed working fluid back to the evaporator for cooling the at least one primary contact,
    wherein at least a pair of busbars connect the busbar joint to the primary contact, the busbars defining a space therebetween, and wherein the heat transfer structure includes at least one thermally conductive heat spreader in the space between the busbars and extending from the busbar joint to the primary contact.

10. The cooling apparatus of claim 9, wherein the at least one heat spreader is provided between pairs of busbars of the busbar joint.

11. Heat transfer structure for a switchgear, the switchgear having one or more primary contacts constructed and arranged to connect to a terminal of a circuit breaker, and busbar joints connected to the primary contacts, each busbar joint including at least a pair of first busbars in a parallel arrangement defining a space there-between, the heat transfer structure comprising:
   a plurality of fins, and
   a plurality of heat spreaders that pass through the fins to join the fins so that the fins are in spaced relation,
   wherein the heat transfer structure is constructed and arranged to be received in the space between the pair of first busbars so that the heat spreaders distribute heat along the first busbars, with the fins transferring heat to surrounding air by natural convection.

12. The structure of claim 11, wherein the fins are metal and disposed substantially transversely with respect to the heat spreaders.

13. The structure of claim 11, in combination with the busbar joint, with the pair of first busbars being coupled to second busbars, the second busbars being constructed and arranged to connect with a primary contact.

14. The combination of claim 13, wherein an end of each heat spreader is coupled with a second busbar.

15. The combination of claim 14, wherein each heat spreader is a metal wire or a heat pipe.

16. A method of cooling a switchgear having at least one primary contact constructed and arranged to connect to a terminal of a circuit breaker, with a busbar joint being connected to the primary contact, the method comprising the steps of:
   associating an evaporator with the primary contact,
   providing a condenser located at a higher elevation than the evaporator,
   providing heat pipe structure fluidly connecting the evaporator with the condenser, and providing a working fluid in the evaporator,
   coupling heat transfer structure to the busbar joint,
   transferring heat from the primary contact to the working fluid to cause the working fluid to evaporate in the evaporator with the evaporated vapor being delivered to the condenser via the fluid conduit structure,
   removing heat from the busbar joint via the heat transfer structure, and
   passively returning the working fluid that condenses in the condenser to the evaporator via the fluid conduit structure,
   wherein the heat transfer structure includes a plurality of fins, and a plurality of heat spreaders that pass through the fins to join the fins so that the fins are in spaced relation, the step of coupling provides the heat transfer structure in a space between a pair of busbars of the busbar joint, and the step of removing heat includes distributing heat along the busbars with the heat spreaders, with the fins transferring heat to surrounding air by natural convection.

17. A method of cooling a switchgear having at least one primary contact constructed and arranged to connect to a terminal of a circuit breaker, with a busbar joint being connected to the primary contact, the method comprising the steps of:
   associating an evaporator with the primary contact,
   providing a condenser located at a higher elevation than the evaporator,
   providing heat pipe structure fluidly connecting the evaporator with the condenser, and providing a working fluid in the evaporator,
   coupling heat transfer structure to the busbar joint,
   transferring heat from the primary contact to the working fluid to cause the working fluid to evaporate in the evaporator with the evaporated vapor being delivered to the condenser via the fluid conduit structure,
   removing heat from the busbar joint via the heat transfer structure, and
   passively returning the working fluid that condenses in the condenser to the evaporator via the fluid conduit structure,
   wherein the step of coupling the heat transfer structure provides thermally conductive connection structure coupling the busbar joint to a portion of the heat pipe structure and the step of removing heat includes transferring heat to the heat pipe structure via the connection structure.

\* \* \* \* \*